Sept. 21, 1971 J. F. BAIGAS, JR 3,606,735
AIR FILTER ASSEMBLY PROVIDING INCREASED FILTERING
SURFACE AREA FOR A GIVEN VOLUMETRIC SIZE
Filed July 1, 1969 3 Sheets-Sheet 1
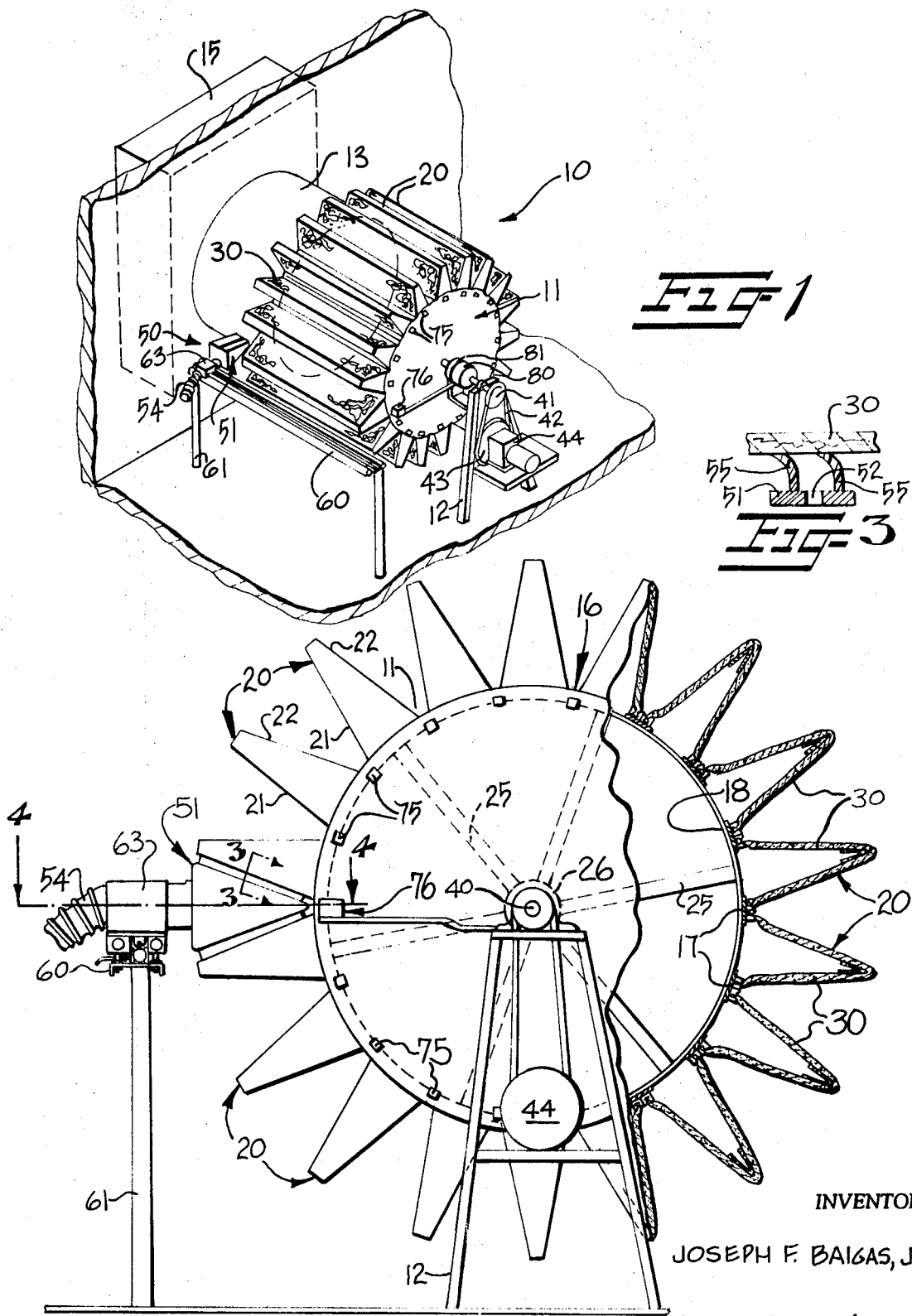
INVENTOR:
JOSEPH F. BAIGAS, JR.
ATTORNEYS

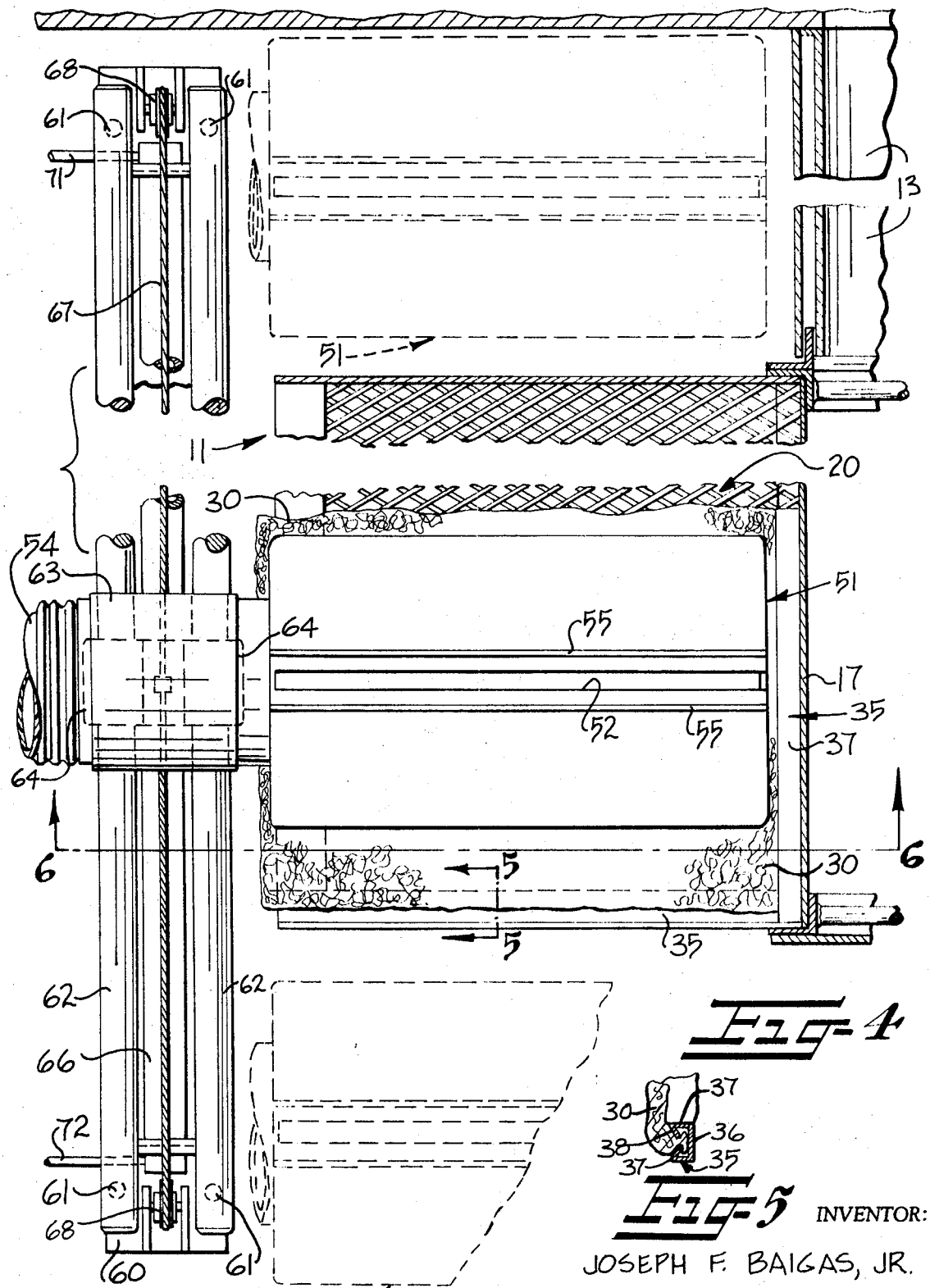
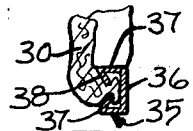

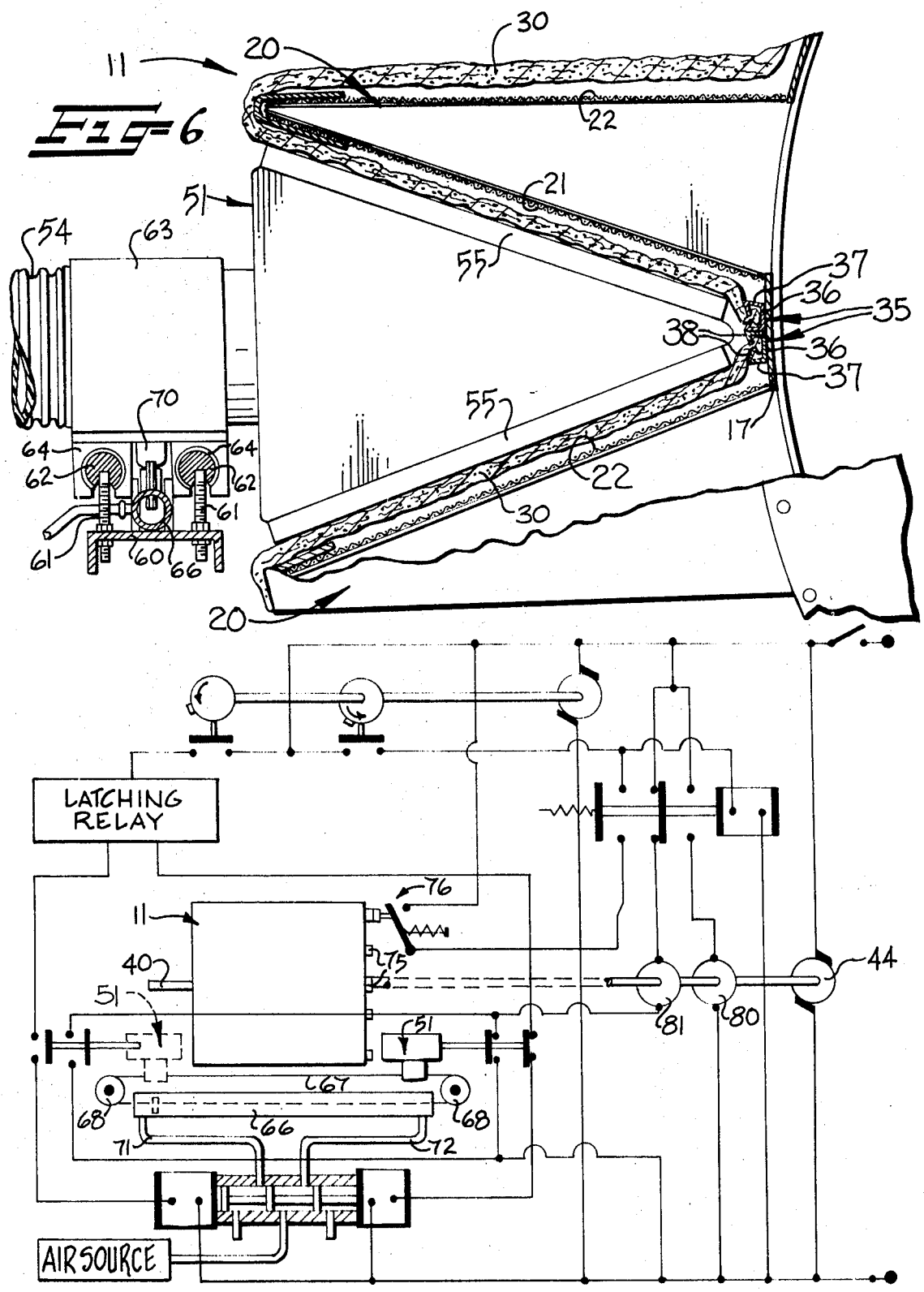

United States Patent Office 3,606,735
Patented Sept. 21, 1971

3,606,735
AIR FILTER ASSEMBLY PROVIDING INCREASED FILTERING SURFACE AREA FOR A GIVEN VOLUMETRIC SIZE
Joseph F. Baigas, Jr., Charlotte, N.C., assignor to Aeronca, Inc., Middletown, Ohio
Filed July 1, 1969, Ser. No. 838,146
Int. Cl. B01d 46/26
U.S. Cl. 55—273                                25 Claims

ABSTRACT OF THE DISCLOSURE

An air filter assembly specifically characterized by providing increased filtering surface area for a given volumetric size comprising a support cage having a generally cylindrical hollow base portion and a plurality of radially extending, hollow, perforate protuberance portions projecting outwardly from the base portion and extending longitudinally thereof, the number of protuberance portions being related to the diameter of the cylindrical base portion and being approximately between 3-6 protuberances per foot of diameter of the base portion, and flexible filter media disposed around and secure to the outside surface of the protuberance portions for filtering a stream of air passing therethrough. Preferably, the air filter assembly includes means for mounting the air filter for rotation in the stream of air, means for rotating the air filter in the stream of air, and improved means positioned in operative relationship with the air filter for cleaning the filter media.

---

This invention relates to an air filter assembly specifically characterized by providing increased filtering surface area for a given volumetric size.

In the filtering of dirty air from a room of a manufacturing plant or other installations, it has normally been the practice to utilize large cylindrical or drum-type rotary filters, as illustrated in FIG. 1 of U.S. Pat. No. 3,345,805, issued Oct. 10, 1967, and assigned to the assignee of the present application. These cylindrical or drum-type filters are also utilized in a number of other air filtering operations and have generally been considered satisfactory for such uses.

However, certain problems have been presented in the use of these cylindrical or drum-type filters and in the use of other air filters. These problems include the bulk or volumetric size of the filter required to provide sufficient filter surface area for cleaning of the air to be filtered. Particularly, the standard size cylindrical or drum-type filter, which occupies standard space requirements utilized in these filtering systems, have not provided adequate filtering surface area to meet all requirements of the filtering systems. Also, adequate cleaning of the filter media on the filtering surfaces has presented a problem inasmuch as the velocity of air flow through the air filter is dependent upon keeping the filter media relatively clean.

Accordingly, it is the object of this invention to provide an improved air filter and air filter assembly which provide increased filtering surface area for a given volumetric size and which preferably include an improved cleaning means for cleaning the filter media to allow a higher velocity of air flow therethrough.

By this invention, it has been found that the above object may be accomplished by providing an air filter assembly including an air filter means comprising a support cage adapted to be placed in a stream of air to be filtered and having a generally cylindrical, hollow base portion defining outside and inside surfaces and a plurality of radially extending, hollow, perforate protuberance portions projecting outwardly from the outside surface of the base portion and extending longitudinally thereof and defining at least two substantially flat, perforate, generally radially and longitudinally extending outside surfaces on each protuberance portion, the number of protuberance portions being related to the diameter of the cylindrical base portion and being approximately between 3-6 protuberances per foot of diameter of the base portion, and flexible filter media disposed around and secured to the outside surface of the protuberance portions for filtering a stream of air passing therethrough.

The air filter assembly may additionally and preferably include means mounting the air filter for rotation in the stream of air to be filtered so that the stream of air enters the air filter through the filter media and into the hollow inerior of the cylindrical portion of the support cage, drive means for rotating the air filter means in the stream of air to be filtered for obtaining maximum filtering action, and means positioned in operative relationship with the air filter means for cleaning the filter media. Additionally, the assembly preferably includes means controlling the drive means for stopping rotation of the air filter means in predetermined positions during operation of the cleaning means, and the cleaning means preferably comprises a suction cleaning head and a carriage and drive means mounting the cleaning head in operative position for linear reciprocating longitudinal movement between the protuberance portions for suction cleaning of the filter media disposed therearound when rotation of the filter means has been stopped.

Some of the objects and advantages of the invention having been stated, other objects and advantages will appear as the description proceeds when taken in conjunction with the accompanying drawings, in which:

FIG. 1 is a perspective view of the air filter assembly of this invention;

FIG. 2 is a side elevational view, partially broken away, of the air filter assembly of FIG. 1;

FIG. 3 is an enlarged cross-sectional detail taken generally along the line 3—3 of FIG. 2;

FIG. 4 is an enlarged cross-sectional view, broken away, and taken generally along the line 4—4 of FIG. 2;

FIG. 5 is a cross-sectional detail taken generally along the line 5—5 of FIG. 4;

FIG. 6 is a cross-sectional view taken generally along the line 6—6 of FIG. 4; and FIG. 7 is a schematic wiring diagram of the controls for the air filter assembly of this invention.

Referring now to the drawings wherein a preferred embodiment of this invention is illustrated, the air filter assembly is generally designated therein by the reference numeral 10.

The air filter assembly 10 comprises a support cage, generally indicated at 11, which is adapted to be placed in a stream of air to be filtered. As shown in FIG. 1, the support cage 11 is supported from the floor by any suitable support, such as indicated at 12, on one end thereof and may be rotatably attached or otherwise to a conduit 13 on the other end thereof which leads through a wall having a blower or suction fan 15 on the other side thereof for recirculation of the filtered air in any suitable manner, such as well understood by those with ordinary skill in the art.

The support cage 11 includes a generally cylindrical, hollow base portion 16 defining an outside surface 17 and an inside surface 18 and a plurality of radially extending, hollow, perforate protuberance portions 20 projecting outwardly from the outside surface 17 of the base portion 16 and extending longitudinally thereof and being spaced apart therearound and defining at least two substantially flat, perforate, generally radially and longitudinally extending outside surfaces 21 and 22 on each protuberance portion 20. The protuberance portions are generally triangular shaped in cross-section, as may be seen in FIG. 2, to provide maximum surface area on the outside surfaces 21 and 22 thereof.

The support cage 11 may be constructed of any suitable materials normally utilized in constructing support cage structures of conventional air filters. The base portion 16 of the support cage 11 may be formed from any suitable framing material supported by radially extending spoke members 25 at each end thereof, as shown in FIG. 2, which extend to internal hub members 26 at each end of the support cage 11, for purposes to be hereinafter described. The outside surface 17 of the cylindrical base portion 16 may be covered with any suitable material, such as stainless steel, etc., so as to make the outside surface 17 between protuberance portions 20 inperforate to flow of air and thereby force the flow of air through the protuberance portions 20. The portuberance portions 20 may also be formed of any suitable framing material and may be covered with wire mesh or other suitable matreial so as to form perforate outside surfaces 21 and 22 to allow the flow of air to be filtered therethrough and into the hollow interior of the base portion 16.

The side of the base portion 16 away from the conduit 13 may be closed by sheet steel or other material so as to force the flow of air through the protuberance portions 20 into the hollow interior of the base portion 16 and out the conduit 13. This flow of air may be created by the blower 15 causing a negative or suction pressure through the hollow interior of the support cage 11.

For performing a filtering action of the air passing through the support cage 11, filter media 30 is disposed around and secured to the outside surfaces 21 and 22 of the protuberance portions 20 of the support cage 11 in a manner to be hereinafter described.

The filter media 30 may be any suitable type of material utilized in air filters and, preferably, is of the resin-bonded, non-woven type formed from an air-laid batt of non-woven textile fibers disposed in random, intermingled, three-dimensional arrangement and bonded with a resinous bonding material at least at spaced locations where the fibers cross to form an integral non-woven fabric structure. The fibers utilized in the preferred resin-bonded, non-woven filter media may be any suitable fibers and particularly fibers selected from the group consisting of polyester, nylon, acrylic, acetate, modacrylic, triacetate, polypropylene, polyethylene or combinations thereof. The resinous bonding material utilized therein may be of any suitable type of resinous bonding material and particularly those bonding materials selected from the group consisting of acrylic, vinyl, melamine, polyvinyl chloride, polyvinyl acetate, butadiene styrene, butadiene acrylonitrile, melamine formaldehyde, urea formaldehyde, phenol formaldehyde, polyvinylidene chloride, epoxy type resins or combinations thereof.

The filter media 30 may also comprise a plurality of layers of different densities so that the dirty air passing therethrough is filtered at varying degrees during its path through the media.

For removably securing the filter media 30 around the portuberance portions 20 and around the outside surfaces 21 and 22 thereof, there are provided elongate frame members 35 secured to the support cage 11 in the manner shown in FIGS. 4, 5 and 6, such that a pair of frame members 35 are positioned in side-by-side relationship to extend longitudinally of the support cage 11 and be secured to the cylindrical base portion 16 in the spaces between each of the protuberance portions 20, as shown in FIG. 6. Also, a frame member 35 is secured to and extends radially outwardly along the ends of each of the outside surfaces 21 and 22 of the protuberance portions 20, in the manner shown in FIGS. 4 and 5, so that frame members are disposed around the periphery of each of the outside surfaces 21 and 22 except for the portion of the periphery of these surfaces which meets each other and which forms the top of the triangular cross-section thereof.

Referring to FIGS. 5 and 6, each of the frame members 35 comprises a bottom wall 36 having longitudinal side edges, side walls 37 projecting perpendicularly from the longitudinal edges of the bottom wall 36 and defining a trough therebetween, and somewhat resilient, longitudinally extending flap members 38 projecting from the side walls 37 inwardly toward each other into the trough to define a narrow slot of less width than the width of the filter media 30 for releasably receiving the filter media therein, as shown in FIGS. 5 and 6. These frame members provide an extremely good holding action on the filter media 30, but allow the filter media to be stripped therefrom for replacement when necessary.

With the use of above-defined frame members 35, a separate piece of generally rectangular filter media may be wrapped around each of the protuberance portions 20 and releasably secured along the periphery thereof within the frame members 35 by insertion into the slot defined by the flap members 38.

For obtaining maximum filtering surface area for a given volumetric size and to operate the air filter within desired air flow ranges, it has been determined that the number of protuberance portions is related to the diameter of the cylindrical base portion and should be approximately between 3–6 protuberances per foot of diameter of the base portion. Additionally, it has been determined that maximum efficiency and filtering surface area can be obtained when the diameter of the cylindrical base portion is approximately between 4–6 feet which would provide preferably between approximately 18–24 protuberance portions. With this arrangement the generally radial altitude of each of the protuberance portions from the cylindrical base portion is preferably between approximately 18–28 inches. While the above ranges of size are preferable and constitute the preferred ranges for this invention, it has been found that many factors could vary these sizes, as discussed below.

For example, an air filter, having a 5-foot diameter cylindrical base portion, 18 protuberance portions of 18 inches in altitude, and a length of 5 feet, would have a filtering surface area of 270 square feet or a unit area of 54 square feet per foot of diameter of the base portion. It is noted that this provides a significantly increased filtering surface area over a conventional cylindrical or drum-type filter of 8 feet in diameter and 5 feet in length which would provide a filtering surface area of only 125 square feet, while both occupy the same volumetric space or are the same volumetric size of approximately 171.5 cubic feet.

With the above size filter constructed according to this invention and which would utilize an air flow velocity of 300 feet per minute at the filter media, an air flow per foot of length of the filter of 16,200 cubic feet per minute is realized. The following table illustrates various air flows obtained with varying air velocities at the media:

TABLE I

| 18" protuberances, media velocity, f.p.m.: | 18 protuberances on 5' diameter base, air flow/ft. of filter length, c.f.m. |
|---|---|
| 100 | 5,400 |
| 200 | 10,800 |
| 300 | 16,200 |
| 400 | 21,600 |
| 500 | 27,000 |

The above could be varied by the number of protuberance portions and the altitude of the protuberance portions. As stated above, it is felt that the number of protuberance portions is directly related or dependent upon the diameter of the cylindrical base portion. As illustrated in the drawings, 18 protuberance portions are shown on a 5-foot diameter cylindrical base portion. It is believed that this is optimum, but the number of protuberance portions could be increased to 24 on the 5-foot diameter cylindrical base portion. Under these conditions, the area using 18 inch altitude protuberance portions increases to 360 square feet or 72 square feet per foot of length. In this case, the air flow is as follows for various media velocities:

TABLE II

| 18″ protuberances, media velocity, f.p.m.: | 24 protuberances on 5′ diameter base, air flow/ft. of filter length, c.f.m. |
|---|---|
| 100 | 7,200 |
| 200 | 14,400 |
| 300 | 21,600 |
| 400 | 28,800 |
| 500 | 36,000 |

If the altitude of the protuberance portions is increased, the unit air flow will also increase. An increase in altitude of the protuberance portions from 18 to 28 will increase the area by a factor of 1.55 and the air flow in the preceding tables would be:

TABLE III

| | 84 sq. ft./ft. of length, 18 protuberances, 28″ altitude, c.f.m. | 112 sq. ft./ft. of length, 24 protuberances, 28″ altitude, c.f.m. |
|---|---|---|
| Media velocity, f.p.m.: | | |
| 100 | 8,400 | 11,200 |
| 200 | 16,800 | 22,400 |
| 300 | 25,200 | 33,600 |
| 400 | 33,600 | 44,800 |
| 500 | 42,000 | 56,000 |

The capacity for flow can also be varied by increasing or decreasing the diameter of the cylindrical base portion. This increases or decreases the number of protuberance portions possible and varies the flow accordingly. One limiting factor is outlet velocity of the filter assembly. It has been found that if this velocity greatly exceeds 4,000 feet per minute that additional fan horsepower is required due to the increase pressure loss in the system. Accordingly, it is felt that a maximum outlet ring velocity should be approximately 4,000 feet per minute.

The above defined air filter means including the support cage structure 11 and the filter media 30 thereon may be mounted for rotation in the stream of air passing in through the protuberance portions 20 into the hollow interior of the base portion 16 of the support cage 11 and out the conduit 13 through the wall for recirculation. For this purpose, the hubs 26 on each longitudinal side of the support cage 11 are mounted on a shaft 40 for rotation therewith. The shaft 40 is suitably carried, at the left-hand side thereof when viewed in FIG. 1, by any suitable bearing means (not shown) and at the right-hand side thereof is mounted for rotation by any suitable bearing means on the support 12. The outside end of the shaft 40 which extends beyond the support 12 includes a pulley 41 which receives a belt 42 therearound which also passes around a pulley 43 extending from a drive shaft of any suitable motor 44. Thus, it may be seen that the filter means may be rotated by the motor 44 through the above-described driving connections.

The above-described filter assembly 10 may also include means for cleaning the filter media 30 therearound. This cleaning means could be manual, semi-manual or automatic with the automatic system being preferred and being the one illustrated in the drawings.

If a manual cleaning system is utilized, the support cage 11 and the filter media 30 would not be rotated and the filter media would simply be cleaned by an operator utilizing a hand suction vacuum cleaner wherein the vacuum cleaner would be run longitudinally of the filter media and the support cage 11 rotated manually to clean various sections thereof.

In a semi-automatic system, a drive motor, such as 44, would be utilized. An operator would stand in front of the filter assembly with a hand vacuum cleaner and clean the protuberance portions with the filter media thereon within his comfortable reach. He could then actuate a switch (not shown), either hand or foot switch, for rotating the support cage a predetermined distance bringing unclean protuberance portions within his reach and repeat the above operation until the entire filter media is cleaned.

Referring now to the automatic cleaning means illustrated in the drawings and indicated generally therein at 50, the cleaning means 50 comprises a hollow suction or vacuum cleaning head 51, preferably of generally triangular shape in transverse cross-section, as may be seen in FIGS. 2 and 6, for easily being disposed in the space between protuberance portion 20. The suction cleaning head 51 includes elongate slots 52 on both surfaces thereof adjacent the filter media 30 and extending in a generally radial direction with respect to the support cage 11 when the suction head 51 is positioned between protuberance portions 20, as may be seen in FIGS. 1 and 4. While the above described shape of the cleaning head 51 is preferable, the cleaning head may also be generally V-shaped or U-shaped for substantially surrounding a portion of protuberance portion 20.

The suction cleaning head 51 is connected with a suitable conduit 54 which leads to a suitable source of negative pressure (not shown) so as to form a suction or negative pressure through the suction cleaning head 51 and through the slots 52 so that a vacuum or suction cleaning of the filter media 30 adjacent the slots 52 may be obtained. The suction cleaning head 51 is mounted for linear, reciprocating, longitudinal movement between the protuberance portions 20 by means to be described below so that as it passes along the outside surfaces 21 and 22 of the protuberance portions 20, the dirt or other particles contained on the outside surfaces of the filter media 30 will be vacuum cleaned therefrom.

For aiding in this vacuum or suction cleaning action, the cleaning head 51 includes resilient flap members 55 secured to the cleaning surfaces of the cleaning head 51 on each side of the slots 52 and extending outwardly from the cleaning surfaces for wiping engagement with the filter media 30 during reciprocating, longitudinal movement of the cleaning head 51 between the protuberance portions 20, as may be seen particularly in FIG. 3. These resilient flaps create a stronger suction zone therebetween and on each side of the suction slot 52 for optimum cleaning efficiency. Also, as described above, the portions of the outside surface of the cylindrical base portion 16 between protuberance portions 20 is made imperforate and therefore does not require any cleaning action by the suction cleaning head 51 which would be difficult to obtain.

To mount the suction cleaning head 51 for the linear, reciprocating, longitudinal movement between the protuberance portions 20, there is provided a carriage and drive means comprising an elongate support member 60 extending longitudinally of the filter assembly and including suitable leg members for spacing of the support member 60 upwardly from the floor or other surface generally adjacent the middle of one side of the filter assembly, as shown in FIGS. 1 and 2. The support member 60 carries a pair of upwardly extending stud members 61 at each longitudinal end thereof, as may be seen in FIGS. 4 and 6. These upstanding stud members 61 carry two generally cylindrical bearing rod members 62 which extend the length of the support member 60 and along the entire length of the support cage 11, as shown in FIGS. 1 and 4. Both the support member 60 and the bearing rod members 62 extend somewhat beyond the sides of the support cage 11, as may be seen in FIG. 1, for purposes to be described below.

The cleaning head 51 includes a collar member 63 secured to the rear end thereof and forming part of the coupling for the conduit 54 with the cleaning head 51. The collar member 63 includes a pair of downwardly extending bearing members 64 having generally cylindrical cut-outs in the bottom portion thereof for reception of the bearing rod members 62, as may be seen in FIG. 6. The generally cylindrical cut-outs include bearing surfaces such that the block member 64 may slide along the rod member 62. Thus, the rod member 62 and the block member 64 form a part of a carriage means whereby the cleaning head 51 may be moved in a longitudinal direction along the rod member 62 from one end of the filter assembly to the other end of the filter assembly.

For effecting the above longitudinal movement of the cleaning head 51 along the bearing rod members 62, the support member 60 carries a double-acting piston and cylinder 66 which extends generally along the length of the support member 60, in the manner shown in FIGS. 4 and 6. This piston and cylinder 66 includes an endless cable 67 passing therethrough and attached to the piston member therewithin. The cable 67 also passes around pulley members 68 mounted on the support member 60 at each end of the piston and cylinder 66. The cable 67 also loops around and passes longitudinally along the entire upper surface of the support member 60 and is attached to a depending lug 70 from the collar member 63. The piston and cylinder 66 includes conduits 71 and 72 connected to each end thereof and leading from a source of air such that when air is introduced to one side of the piston and cylinder 66, the piston will be moved in one direction to in turn move the cable 67 in the opposite direction carrying the cleaning head 51 in a linear, longitudinal path of travel between the protuberance portions 20 of the filtering assembly.

For an automatic cleaning operation of the filtering means by the cleaning means 50, there are provided magnetic means 75 on one end of the support cage 11, as shown in FIGS. 1 and 2, between the protuberance portions 20. A magnetic sensing means 76 including a suitable electrical circuit, such as shown in FIG. 7, is mounted in a stationary position opposite the generally longitudinal path of travel of the cleaning head 51 for sensing the space between the protuberance portions as the support cage 11 is being rotated by the motor 44 by sensing the magnetic means 75. The sensing means 76 is operatively connected with a suitable clutch 80 and a brake 81 on the shaft 40 driving the support cage 11 so as to stop rotation of the support cage 11 when a magnetic means 75 has been sensed to stop rotation of the support cage 11 in position for cleaning by the cleaning means 50. The sensing means 76 will aslo cause actuation of the piston and cylinder 66 for moving of the cleaning head 51 in its linear, longitudinal path of travel between protuberance portions 20.

The schematic wiring diagram shown in FIG. 7 illustrates a suitable electrical circuit and related component parts for effecting the above-described operation of the cleaning means 50. It is believed that this schematic wiring diagram may be well understood by all those with ordinary skill in the art and that a complete explanation thereof is not necessary inasmuch as a visual examination of this schematic wiring diagram will reveal the complete operation thereof.

As may be seen in this FIG. 7, the support cage 11 carrying the filter media 30 will rotate a predetermined distance until a space between protuberance portions has been aligned with the suction cleaning head 51 which is disposed on one side thereof to allow rotation thereof. When the support cage 11 has arrived at this position, the magnetic sensing means will sense the presence of the magnetic means to effect disengagement of the clutch 80 and engagement of the brake 81 to stop the rotation of the support cage 11. With the support cage 11 in the stationary position, the piston and cylinder mechanism 66 will be actuated to move the cleaning head 51 in its linear, longitudinal path of travel in one direction along the space between protuberance portions 20 to the other end of the support cage 11 for the suction cleaning of the filter media 20.

When the cleaning head 51 has reached the other end of the support cage 11 and is positioned outwardly thereof and away from the space between protuberance portions, the brake 81 will be disengaged and the clutch 80 engaged to again allow rotation of the support cage 11 and the filter media 30 until another space between protuberance portions 20 has been aligned with the path of travel of the cleaning head 51. When this happens, the sensing means 76 will again sense a magnetic means 75 and cause disengagement of the clutch 80 and engagement of the brake 81 and actuation of the piston and cylinder mechanism 66 to move the cleaning head 51 in the opposite direction in a linear, longitudinal path of travel for the suction cleaning of the filter media between the aligned protuberance portions 20.

The above-described cycle of operation can be repeated continuously allowing a continual combined rotating filtering action of the filter assembly and a cleaning action thereof or it may be operated periodically to clean all of the filter media 30 around each of the protuberance portions 20 and then the operation of the cleaning means discontinued and the filter means rotated only until cleaning is again required.

Thus, it may be seen that this invention has provided an improved air filter and air filter assembly which utilizes increased filtering surface area for a given volumetric size and which includes an improved cleaning means for completely automatically cleaning the filter media to allow a higher velocity of air flow therethrough.

In the drawings and specification, there has been set forth a preferred embodiment of the invention and, although specific terms are employed, they are used in a generic and descriptive sense only and not for purposes of limitation.

What is claimed is:

1. An air filter assembly specifically characterized by providing increased filtering surface area for a given volumetric size, said filter assembly comprising:
   (a) a support cage means adapted to be placed in a stream of air to be filtered and having a generally cylindrical, hollow base portion defining outside and inside surfaces and a plurality of radially extending, hollow, perforate, protuberance portions projecting outwardly from said outside surface of said base portion and extending longitudinally thereof and defining at least two substantially flat, perforate, generally radially and longitudinally extending outside surfaces on each protuberance portion, the number of protuberance portions being related to the diameter of said cylindrical base portions and being approximately between 3–6 protuberances per foot of diameter of said base portion; and
   (b) flexible filter media disposed around and secured to said outside surfaces of said protuberance portions for filtering a stream of air passing therethrough.

2. An air filter assembly, as set forth in claim 1, in which said filter media comprises resin-bonded, non-woven textile material.

3. An air filter assembly, as set forth in claim 1, in which said protuberance portions are generally triangular shaped in transverse cross-section to provide maximum filtering surface area on said outside surfaces thereof.

4. An air filter assembly, as set forth in claim 1, in which said protuberance portions are spaced apart around said outside surface of said cylindrical base portion, and in which said outside surface of said base portion between said protuberance portions is imperforate to force the flow of air to be filtered through said protuberance portions for ease in cleaning said filter media disposed thereon.

5. An air filter assembly, as set forth in claim 1, including means attached to said support cage means for removably securing said filter media around said outside surfaces of said protuberance portions for ease in removal and replacement of said filter media.

6. An air filter assembly, as set forth in claim 5, in which said means for removably securing said filter media comprises elongate frame members disposed around at least a portion of the periphery of each of said outside surfaces of said protuberance portions and each of which comprises a bottom wall having longitudinal side edges, side walls projecting perpendicularly from said longitudinal edges of said bottom wall and defining a trough therebetween, and somewhat resilient, longitudinally extending flap members projecting from said side wall inwardly toward each other into said trough to define a narrow slot of less width than the width of said filter media for releasably receiving said filter media therein.

7. An air filter assembly, as set forth in claim 1, including means for cleaning said filter media.

8. An air filter assembly, as set forth in claim 1, in which the generally radial altitude of said protuberance portions from said base portion is approximately between 18–28 inches for optimum filtering efficiency.

9. An air filter assembly, as set forth in claim 1, in which the diameter of said cylindrical base portion is approximately between 4–6 feet and the number of protuberance portions is approximately between 18–24 for optimum filtering efficiency.

10. An air filter assembly specifically characterized by providing increased filtering surface area for a given volumetric size, said filter assembly comprising:
(a) a support cage means adapted to be placed in a stream of air to be filtered and having a generally cylindrical, hollow base portion defining outside and inside surfaces and a plurality of radially extending, hollow, perforate protuberance portions projecting outwardly from said outside surface of said base portion and extending longitudinally thereof and defining at least two substantially flat, perforate, generally radially and longitudinally extending outside surfaces on each protuberance portion, the diameter of said cylindrical base portion being approximately between 4–6 feet, the number of protuberance portions being approximately between 18–24 and the generally radial altitude of said protuberance portions from said base portion being approximately between 18–28 inches for optimum filtering efficiency; and
(b) flexible filter media disposed around and secured to said outside surfaces of said protuberance portions for filtering a stream of air passing therethrough.

11. An air filter assembly, as set forth in claim 10, in which said filter media comprises resin-bonded, non-woven textile material.

12. An air filter assembly, as set forth in claim 10, in which said protuberance portions are generally triangular shaped in transverse cross-section to provide maximum filtering surface area on said outside surfaces thereof.

13. An air filter assembly, as set forth in claim 10, in which said protuberance portions are spaced apart around said outside surface of said cylindrical base portion, and in which said outside surface of said base portion between said protuberance portions is imperforate to force the flow of air to be filtered through said protuberance portions for ease in cleaning said filter media disposed thereon.

14. An air filter assembly, as set forth in claim 10, including means attached to said support cage means for removably securing said filter media around said outside surfaces of said protuberance portions for ease in removal and replacement of said filter media.

15. An air filter assembly, as set forth in claim 14, in which said means for removably securing said filter media comprises elongate frame members disposed around at least a portion of the periphery of each of said outside surfaces of said protuberance portions and each of which comprises a bottom wall having longitudinal side edges, side walls projecting perpendicularly from said longitudinal edges of said bottom wall and defining a trough therebetween, and somewhat resilient, longitudinally extending flap members projecting from said side wall inwardly toward each other into said trough to define a narrow slot of less width than the width of said filter media for releasably receiving said filter media therein.

16. An air filter assembly, as set forth in claim 10, including means for cleaning said filter media.

17. An air filter assembly specifically characterized by providing increased filtering surface area for a given volumetric size, said filter assembly comprising:
(a) a support cage means adapted to be placed in a stream of air to be filtered and having a generally cylindrical, hollow base portion defining outside and inside surfaces and a plurality of radially extending, hollow, perforate protuberance portions projecting outwardly from said outside surface of said base portion and extending longitudinally thereof and being spaced apart therearound and defining at least two substantially flat, perforate, generally radially and longitudinally extending outside surfaces on each protuberance portion, said protuberance portions being generally triangular shaped in transverse cross-section to provide maximum filtering surface area on said outside surfaces thereof, said outside surfaces of said base portion between said protuberance portions being imperforate to force the flow of air to be filtered through said protuberance portions, the diameter of said cylindrical base portion being approximately between 4–6 feet, the number of protuberance portions being approximately between 18–24 and the generally radial altitude of said protuberance portions from said base portion being approximately 18–28 inches for optimum filtering efficiency;
(b) resin-bonded, non-woven textile filter media disposed around said outside surfaces of said protuberance portions for filtering a stream of air passing therethrough;
(c) means attached to said support cage for removably securing said filter media around said outside surfaces of said protuberance portions for ease in removal and replacement of said filter media; and
(d) means for cleaning said filter media.

18. An air filter assembly specifically characterized by providing increased filtering surface area for a given volumetric size, said assembly including
(a) an air filter means comprising
(1) a support cage means adapted to be placed in a stream of air to be filtered and having a generally cylindrical, hollow base portion defining outside and inside surfaces and a plurality of radially extending, hollow, perforate protuberance portions projecting outwardly from said outside surface of said base portion and extending longitudinally thereof and defining at least two substantially flat, perforate, generally radially and longitudinally extending outside surfaces on each protuberance portion, the number of protuberance portions being related to the diameter of said cylindrical base portion and being approximately between 3–6 protuberances per foot of diameter of said base portion and
(2) flexible filter media disposed around and secured to said outside surfaces of said protuberance portions for filtering a stream of air passing therethrough;
(b) means mounting said air filter means for rotation in the stream of air to be filtered so that the stream of air enters said air filter means through said filter media and into the hollow interior of said cylindrical portion of said support cage means;

(c) drive means for rotating said air filter means in the stream of air to be filtered for obtaining maximum filtering action; and (d) means positioned in operative relationship with said air filter means for cleaning said filter media.

19. An air filter assembly, as set forth in claim 18, including means controlling said drive means for stopping rotation of said air filter means in predetermined positions during operation of said cleaning means.

20. An air filter assembly, as set forth in claim 19, in which said cleaning means comprises a suction cleaning head means and a carriage and drive means mounting said cleaning head means in operative position for linear reciprocating longitudinal movement between said protuberance portions for suction cleaning of said filter media disposed therearound when rotation of said filter means has been stopped.

21. An air filter assembly, as set forth in claim 20, in which said protuberance portions are generally triangular shaped in transverse cross-section and in which said cleaning head means is generally triangular shaped in transverse cross-section and being of such dimensions as to pass easily between said protuberance portions in close proximity to the opposed outside surfaces of adjacent protuberance portions, said cleaning head means having cleaning surface thereon extending generally longitudinally and radially of said filter means and including suction slots therein extending generally radially of said filter means for suction cleaning of said filter media.

22. An air filter assembly, as set forth in claim 21, in which said cleaning head means includes resilient flap members secured to cleaning surfaces on each side of said suction slots and extending outwardly from said cleaning surfaces for wiping engagement with said filter media during reciprocating movement of said suction head between said protuberance portions for creating a suction zone therebetween for optimum cleaning efficiency.

23. An air filter assembly, as set forth in claim 20, in which said carriage and drive means comprises elongate support means extending longitudinally of said filter means for supporting said cleaning head means in the desired position for the reciprocating movement between said protuberance portions, bearing means for securing said cleaning head means on said support means and for allowing sliding linear movement of said cleaning head along said support means, and double-acting, fluid actuated piston and cylinder means operatively connected with said cleaning head means for causing the linear reciprocating movement of said cleaning head means.

24. An air filter assembly, as set forth in claim 23, in which said control means for stopping rotation of said filter means is operatively connected with said piston and cylinder means for actuating same to cause linear reciprocating movement of said cleaning head means; said control means comprising sensing means including an electrical circuit for sensing the space between said protuberance portions and stopping operation of said drive means to stop rotation of said filter means for a predetermined period of time, for actuating said piston and cylinder means to move said cleaning head means in a first linear path of travel across the space between said protuberance portions to the other side of said filter means for cleaning of said filter media, and for recycling the above operation to rotate said filtering means a predetermined distance for sensing of the next space between protuberance portions and cause said cleaning head means to move in the opposite linear direction for intermittent cleaning of said filter media.

25. An air filter assembly, as set forth in claim 24, in which said sensing means comprises magnetic means secured to said filter means in positions between said protuberance portions and magnetically actuated, electrical switch means mounted stationary for actuation by said magnetic means as said filter means is rotated.

References Cited

UNITED STATES PATENTS

| | | | |
|---|---|---|---|
| 2,732,912 | 1/1956 | Young | 55—290 |
| 2,804,978 | 9/1957 | Roden et al. | 210—493 |
| 3,004,276 | 10/1961 | Hoffman | 15—306 |
| 3,026,967 | 3/1962 | Stevens et al. | 55—521X |
| 3,198,336 | 8/1965 | Hyslop | 210—457 |
| 3,345,805 | 10/1967 | Sherrill | 55—283X |
| 3,423,905 | 1/1969 | Chambers | 55—520X |
| 3,448,860 | 6/1969 | Kudlaty | 210—489 |
| 3,470,680 | 10/1969 | Avera | 55—497 |

FOREIGN PATENTS

| | | | |
|---|---|---|---|
| 1,077,105 | 4/1954 | France | 55—294 |

DENNIS E. TALBERT, JR., Primary Examiner

U.S. Cl. X.R.

55—283, 285, 290, 294, 302, 351, 498, 501, 509, 511, 521, 524; 210—391, 404, 493, 506